United States Patent
Hannon

(10) Patent No.: US 8,401,885 B2
(45) Date of Patent: Mar. 19, 2013

(54) SYSTEM AND METHOD FOR AUTOMATICALLY GENERATING AND POPULATING A SCHOOL CALENDAR UTILIZING A PREDETERMINED CLASS ROTATION SCHEDULING PATTERN

(76) Inventor: Meaghan Hannon, Bethesda, MD (US)

(*) Notice: Subject to any disclaimer, the term of this patent is extended or adjusted under 35 U.S.C. 154(b) by 136 days.

(21) Appl. No.: 12/858,744

(22) Filed: Aug. 18, 2010

(65) Prior Publication Data

US 2012/0046986 A1  Feb. 23, 2012

(51) Int. Cl.
*G06Q 10/00* (2012.01)

(52) U.S. Cl. .................................... 705/7.18
(58) Field of Classification Search ............. 705/7.18
See application file for complete search history.

(56) References Cited

U.S. PATENT DOCUMENTS

| | | | |
|---|---|---|---|
| 5,294,229 A * | 3/1994 | Hartzell et al. ............... | 434/336 |
| 5,420,978 A * | 5/1995 | Tozawa et al. ............... | 715/745 |
| 5,813,013 A * | 9/1998 | Shakib et al. ................ | 1/1 |
| 5,842,177 A * | 11/1998 | Haynes et al. ............... | 705/7.24 |
| 5,899,979 A * | 5/1999 | Miller et al. ................ | 705/7.21 |
| 5,960,406 A * | 9/1999 | Rasansky et al. ............ | 705/7.18 |
| 6,002,915 A * | 12/1999 | Shimizu ..................... | 434/350 |
| 6,141,011 A * | 10/2000 | Bodnar et al. ............... | 715/812 |
| 6,141,529 A * | 10/2000 | Remschel .................... | 434/350 |
| 6,369,840 B1 * | 4/2002 | Barnett et al. ............... | 715/853 |
| 6,658,427 B2 * | 12/2003 | Kogut-O'Connell et al. ..... | 1/1 |
| 6,711,378 B2 * | 3/2004 | Kashima ..................... | 434/350 |
| 6,729,885 B2 * | 5/2004 | Stuppy et al. ............... | 434/322 |
| 7,039,596 B1 * | 5/2006 | Lu ............................ | 705/7.13 |
| 7,177,859 B2 * | 2/2007 | Pather et al. ................ | 1/1 |
| 7,295,836 B2 * | 11/2007 | Yach et al. .................. | 455/415 |
| 7,299,217 B2 * | 11/2007 | Oni .......................... | 707/754 |
| 7,721,224 B2 * | 5/2010 | Sellen et al. ................ | 715/804 |
| 7,805,107 B2 * | 9/2010 | Shaver ....................... | 434/350 |
| 8,052,426 B2 * | 11/2011 | Snyder et al. ............... | 434/365 |
| 2001/0049087 A1 * | 12/2001 | Hale .......................... | 434/350 |
| 2002/0055089 A1 * | 5/2002 | Scheirer ..................... | 434/350 |
| 2002/0192631 A1 * | 12/2002 | Weir et al. .................. | 434/350 |
| 2003/0065544 A1 * | 4/2003 | Elzinga et al. ............... | 705/8 |
| 2003/0083051 A1 * | 5/2003 | Ntende ....................... | 455/414 |
| 2003/0154116 A1 * | 8/2003 | Lofton ....................... | 705/8 |
| 2004/0002958 A1 * | 1/2004 | Seshadri et al. .............. | 707/3 |
| 2004/0009461 A1 * | 1/2004 | Snyder et al. ............... | 434/350 |
| 2004/0109025 A1 * | 6/2004 | Hullot et al. ................ | 345/764 |
| 2004/0161728 A1 * | 8/2004 | Benevento et al. .......... | 434/118 |
| 2005/0227216 A1 * | 10/2005 | Gupta ........................ | 434/322 |
| 2006/0041460 A1 * | 2/2006 | Aaron ........................ | 705/8 |
| 2006/0265263 A1 * | 11/2006 | Burns ........................ | 705/8 |

(Continued)

OTHER PUBLICATIONS

Building and Managing the Master Schedule—User Guide Version 2.11—Aspen X2 Development Corporation, Nov. 6, 2009.*

(Continued)

*Primary Examiner* — Scott L Jarrett
(74) *Attorney, Agent, or Firm* — Sughrue Mion, PLLC

(57) ABSTRACT

A scheduling method, computer-readable medium, system, and an apparatus are provided. In this scheduling method, a user request is received, order of classes for each day in the user request is calculated and an organizer is populated with the calculated order of classes for each day of the week specified in the user request and provides a schedule in a predetermined output format or in a format specified by the user. The calculation of the schedule may include for said each day in the user request determining corresponding day in a scheduling cycle, and calculating the order of classes for said corresponding day based on a stored pattern or a table.

19 Claims, 13 Drawing Sheets

U.S. PATENT DOCUMENTS

| | | | | |
|---|---|---|---|---|
| 2007/0149223 | A1* | 6/2007 | Liang | 455/466 |
| 2008/0057482 | A1* | 3/2008 | Snyder et al. | 434/350 |
| 2008/0126428 | A1* | 5/2008 | Swanburg | 707/200 |
| 2008/0178105 | A1* | 7/2008 | Loewenstein | 715/764 |
| 2008/0183547 | A1* | 7/2008 | Halaby | 705/9 |
| 2008/0281665 | A1* | 11/2008 | Opaluch | 705/9 |
| 2009/0083062 | A1* | 3/2009 | Gupta | 705/1 |
| 2009/0280460 | A1* | 11/2009 | Yaskin | 434/307 R |
| 2011/0300525 | A1* | 12/2011 | Wadera et al. | 434/350 |

OTHER PUBLICATIONS

Using the Family Portal—User Guide Version 2.11—Aspen X2 Development Corporation, Nov. 6, 2009.*

Basic Navigation—User Guide Version 2.11—Aspen X2 Development Corporation, Aug. 2009.*

Managing Student Inofmration—User Guide—Version 2.11—Aspen X2 Development Corporation, Nov. 6, 2009.*

Using the Student Portal—User Guide Version 2.11—Aspen X2 Development Corporation, Nov. 6, 2009.*

X2dev.com—product web pages X2 Development Corporation, Jul. 12, 2008, Retrieved from Archive.org Mar. 19, 2012.*

Sandhu, Kuldeep Singh, Automating Class Schedule Generation in the Context of a University Timetabling Information System, Griffith university, Sep. 21, 2001.*

Fernandex, Carlos et al., High School Weekly Timetabling by Evolutionary Algorityms ACM, SAC'99, 1999.*

School timetable definition Wikipedia.org, Retrieved Mar. 19, 2012.*

Scharef, A., A Survey of Automated Timetabling Jan. 1999.*

Martinsons, Maris G. et al., Intelligent timetalbing using a microcomputer The International Journal of Educational Management, vol. 7, No. 5, 1993.*

Fernandes, Carlos et al., High School Weekly Timetabling by Evolutionary Algorithms ACM, SAC'99, 1999.*

Daniel L., Research Summary: Flexible Scheuling NMSA, 2007.*

Hellmansoft.com Web Pages—Planook product pages Hellmansoft, Feb. 14, 2009, Retreived from Archive.org Jul. 30, 2012.*

Chancery SMS Version 6.3 or higher, Scheduling Guide Chancery Student Management Solutions, Nov. 2005.*

Weston, Karen: Inquiy Question: Rotating Schedules in Middle Schools Presentation, Sep. 2, 2006, Retrieved from Archive.org Aug. 13, 2012.*

Seed, Allen, Free At Last: Making the Most of the Flexible Block Schedule Middle School Journal, vol. 29, No. 5, May 1998.*

Chancery SMS 5.0 Stuedent Scheduling—Participant Workbok Chancery Student Management Solutions, Jun. 2004.*

Home Access Center—Parent's Manual Sungard, Pentmation Inc., 2007.*

Greenhill Software Web Pages—Academic Calendar for Outlook Greenhill Software, http://www.greenhillsoftware.co.uk, Retrieved Aug. 14, 2012.*

* cited by examiner

| | |
|---|---|
| 1) # OF DAYS | 7 |
| 2) # OF CLASSES | 7 |
| 3) PATTERN | ROLL AND TUMBLE |
| 4) # OF SLOTS | 6 |

FIG. 3A

| | |
|---|---|
| CLASS 1 | CATHOLIC SOCIAL DEREN |
| CLASS 2 | AP US HISTORY |
| CLASS 3 | HONORS PRE-CAL |
| ⋮ | |
| CLASS 7 | AP CHEMISTRY |

FIG. 3B

| WEEK OF DEC 1-7 | M | T | W | TH | F |
|---|---|---|---|---|---|
| 1<br>08:00 - 08:45 | | AP CHEM — 901<br>ADD<br>EDIT — 902 | | | |
| 2<br>08:50 - 09:35 | | | AP CHEM<br>ADD — 901 | | |
| 3<br>10:15 - 11:00 | 904 — | HOMEWORK — 903<br>TOPIC — 905<br>TEST — 906 | | AP CHEM<br>EDIT — 902 | |
| 4<br>11:05 - 12:25 | | 904 — AP CHEM<br>PAGES 20-40<br>DELETE<br>907 | HOMEWORK — 903<br>TOPIC — 905<br>TEST — 906 | | AP CHEM<br>ADD — 901<br>EDIT — 902 |
| 5<br>01:25 - 02:10 | | | | | |
| 6<br>02:15 - 03:00 | | | | | |

SYSTEM AND METHOD FOR AUTOMATICALLY GENERATING AND POPULATING A SCHOOL CALENDAR UTILIZING A PREDETERMINED CLASS ROTATION SCHEDULING PATTERN

BACKGROUND

1. Field of the Invention

The present disclosure is consistent with the field of scheduling classes, and specifically, to optimizing display of scheduling classes.

2. Description of the Related Art

Conventionally, students in schools and universities complained of monotonous, boring schedules where they had same classes every day of the week. For example, students would have Math, English, Social Studies, Science in same order Monday through Friday such that Math was always taught in the first period, English was always taught in the second period, Social Studies was always taught in the third period, and Science in the last period. Whatever the order, it was the same everyday of the week.

The problem with these types of schedules is not only that they are monotonous and boring but also that they do not bring out student's potentials. If a student performs particularly poorly at a particular time e.g., morning, then he or she might do poorly in Math because it is always the first scheduled class. Similarly, if the student is tired by the last class, he or she might do poorly in Science if it is always scheduled in the last period. That is, although the student might have a natural talent for Math and/or Science, he or she will do poorly because of the scheduled time for the class.

To resolve this problem, a number of schools begin to vary schedules from day to day. As time progresses, the scheduling became more and more complex. For example, a number of schools have implemented rotations. In these rotations, a number of days are specified such as days 1-8 110 depicted in FIG. 1. In this example, on Day 1, Catholic Social Deren is scheduled in the first period 111 as a first class; on Day 2, this class is scheduled in the second period 112 as a second class; on Day 3, this class is scheduled in the third period 113 as a third class, on Day 4, this class is the forth class 114, on Day 5, this class is the fifth class 115, and so on. Some days may skip this class, e.g., on Day 6, there is no Catholic Social Deren.

Also, some classes may require longer periods. For example, a lab for AP Chemistry may require more than the standard 45-50 minutes permitted for a class e.g., see AP Chemistry on Day 6 121. In other words, schools also vary the time for each class. For example, one day, the class may be 45 minutes and yet on another day, this same class may last an hour. As a result, if a teacher is scheduling a test, the teacher can schedule the test for the longer period.

Furthermore, some days may be half days and others may end early or start late for special assemblies, etc. adding additional complications to an already hard to follow schedule. These types of days may further be designated by a letter, e.g., Day 1*m* (m for morning classes only for example) or Day 2*s* (s for shorter classes) and so on.

Although this type of scheduling provides the much needed variety for students and teachers, it is difficult to follow. Especially, if a student likes to do homework in school or review for a test e.g., during lunch, he or she needs to know the exact scheduling/order of classes each day. This is rather complicated, as the student first needs to determine the number of the day in a cycle, then the type of day it is (half day, special assembly day, etc), and then look at the schedule for this day, e.g., schedule for Day 2. With so many steps, errors are likely.

BRIEF SUMMARY

According to one exemplary embodiment, a scheduling method includes determining type of schedule chosen for each day of a week; determining classes and their times for each of the determined type of schedule; and populating a student planner with the determined classes for each day of the week in order classes are scheduled.

According to an aspect of inventive concept, a scheduling method is provided. In this scheduling method, a user request is received, order of classes for each day in the user request is calculated and an organizer is populated with the calculated order of classes for each day of the week specified in the user request and provides a schedule in a predetermined output format or in a format specified by the user. The calculation of the schedule may include for said each day in the user request determining corresponding day in a scheduling cycle, and calculating the order of classes for said corresponding day based on a stored pattern or a table.

According to yet another exemplary embodiment of an inventive concept, a computer-readable medium for storing software code for executing the above-noted method is provided.

Further provided is a scheduling system. In this system, a user input module receives a user quest; a calculation module calculates order of classes for each day in the user request. a populating module which populates an organizer with the calculated order of classes for each day of the week specified in the user request and provides a schedule in a predetermined output format or in a format specified by the user. Wherein the calculation module determines for said each day in the user request a corresponding day in a scheduling cycle, and calculates the order of classes for said corresponding day based on a stored pattern or a table.

BRIEF DESCRIPTION OF THE SEVERAL VIEWS OF THE DRAWINGS

Certain aspects of the present invention will become more apparent by describing in detail illustrative, non-limiting embodiments thereof with reference to the accompanying drawings, in which like reference numerals refer to like elements in the drawings.

FIGS. 3A and 3B are views illustrating GUI for inputting schedule according to an exemplary embodiment.

FIG. 9 is a view illustrating output of schedule for an educator according to an exemplary embodiment.

FIG. 11 is a view illustrating a graphical user interface for setting reminders according to an exemplary embodiment.

DETAILED DESCRIPTION

An exemplary embodiment provides a method of determining weekly schedule for a student planner according to an exemplary embodiment.

Figure 2:
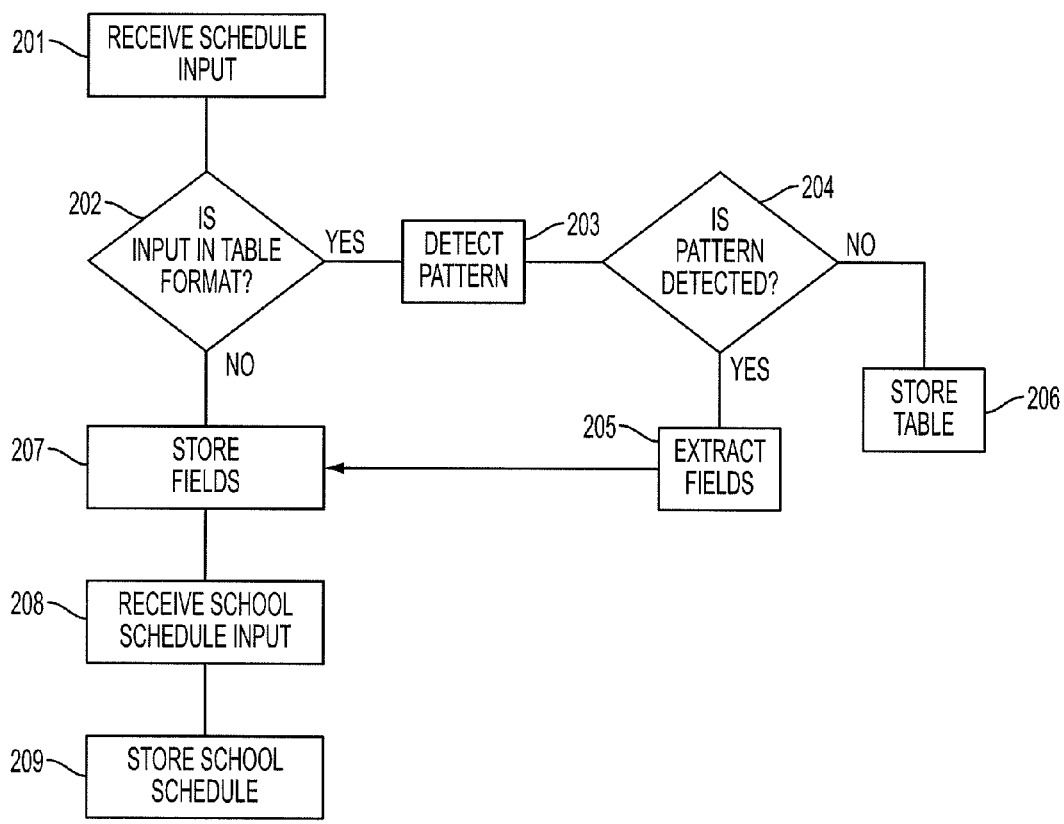
FIG. 2 is a flow chart illustrating generating of a schedule according to an exemplary embodiment.

FIG. 2 is a flow chart illustrating a method of scheduling classes according to an exemplary embodiment. In an exemplary scheduling method, educators that design the schedule, input schedule design 201. The design for the schedule can be input in various formats. In an exemplary embodiment, two possible input options are addressed.

One possible form of input is explained with reference to FIGS. 3A and 3B. For example, educators could input the following information: 1) number of days of repetition, 2) number of classes, 3) pattern, and 4) number of slots per day. FIG. 3A depicts an exemplary input user interface for inputting this information. In FIG. 3A, the educators input length of the cycle. For example, in FIG. 1, the repetition cycle is 7 days. In other words, the classes have a different schedule on each of these seven days or the class schedule is designated for these 7 days.

Next, the total number of classes being taken is input. For example, in FIG. 1, there are seven classes: Catholic Social Deren, AP History, Honors Pre-Cal, Latin, free period (E for empty), Honors English, and AP Chemistry. In addition, teacher's last name may be input as part of the class information. Accordingly, in FIG. 3A, by way of an example, seven is input as total number of classes.

The educators can then select various patterns for scheduling of classes. Some exemplary patterns could be "roll and tumble," explained in detail below and depicted in FIG. 1, backward roll and tumble, skip every other period, mix and match, and so on.

Figure 1:
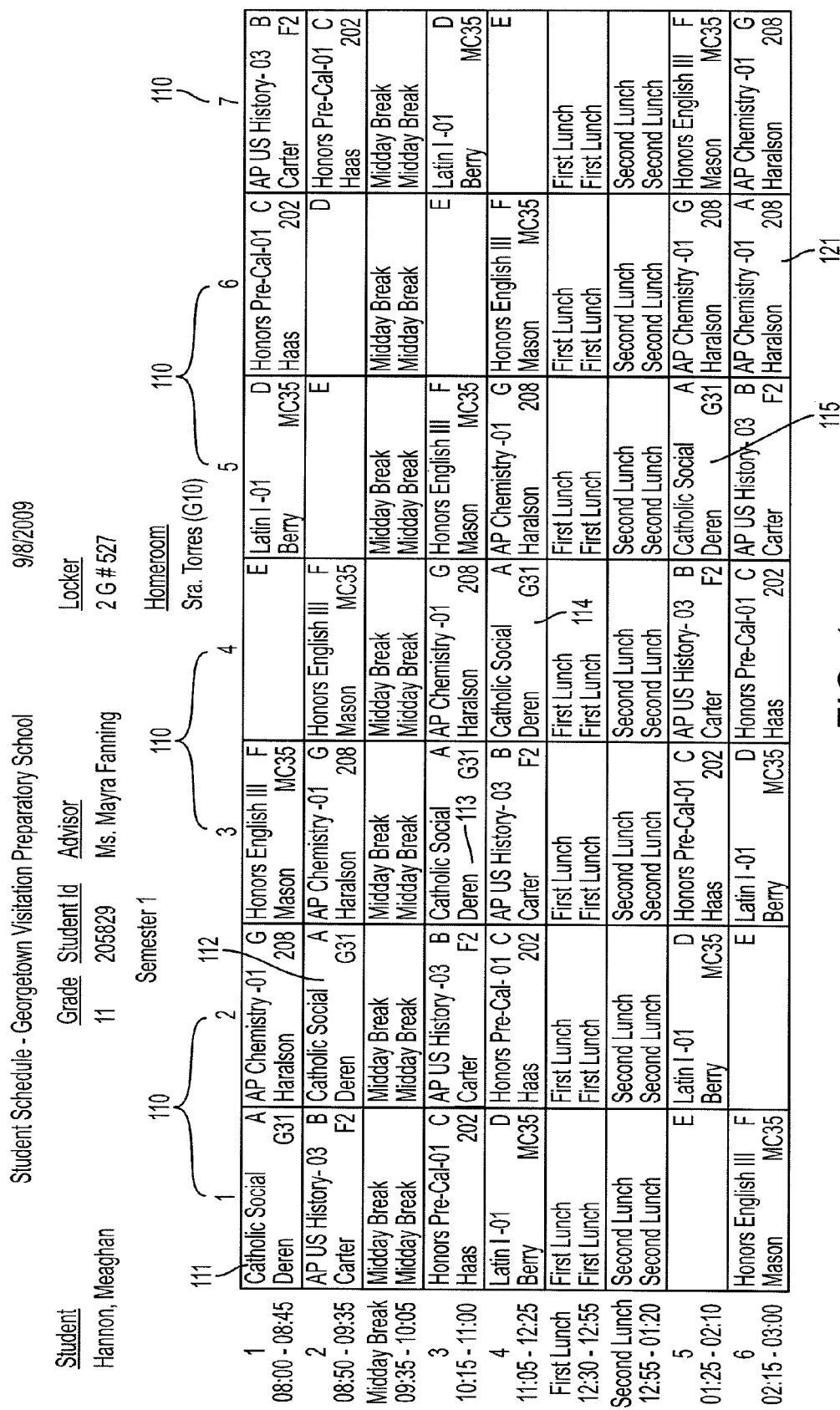
FIG. 1 is a table that illustrates a table of scheduling classes according to a related art.

In an example shown in FIG. 1, the selected pattern is roll and tumble. That is, each class is shifted (rolled) by one on the next day such that Catholic Social Deren is the first class on day 1, the second class on day 2 and so on. Furthermore, after being the last class on day X, this class will be skipped the following day and be the first class on the day thereafter. In example shown in FIG. 1, Latin I is the last class on Day 3, as a result, it tumbles (becomes) the first class on Day 5. Day 4 has no Latin class. Accordingly, in FIG. 3A, "roll and tumble" is input as a selected pattern. A user can choose from a selection of patterns that may be provided with a drop down menu.

The educators then select number of total slots per day. That is, the educators then input number of periods for classes each day. In an example shown in FIG. 1, there are six slots/periods for classes each day. Accordingly, in FIG. 3A, six is input.

When this input is received, the user is asked to designate a class. For example, as depicted in FIG. 3B, the user will designate Catholic Social Deren for class one, AP US History for class two, Honors Pre-Cal for class three and so on. Class 7 is designated as AP Chemistry. These designations may be provided with the teacher's last name for further clarification and for providing access to the system for the teachers.

With reference to FIG. 2, when this type of input is chosen, the input is not in the table format 202 (No) and the input fields are stored in operation 207. On the other hand, if the educators simply input a table such as the one depicted in FIG. 1, the input is in table format 202 (Yes), and the computerized system attempts to detect a pattern. For example, the table is parsed to detect the cycle, number of classes, and number of slots. The table is then parsed to detect class names and which slots they are in. Then, based on this information, the system attempts to detect a known pattern.

By way of an example, a pattern can be detected as follows. The computerized scheduling system assigns a number to each class based on the first occurrence of the class e.g., Catholic Social Deren is assigned a 0, AP US History is assigned a 1, Honors Pre-Cal is assigned a 2, Latin is assigned a 3, Free time (E-empty) is assigned a 4, Honors English is assigned a 5, and AP Chemistry is assigned a 6. For the roll and tumble pattern using the example above, the following equation may be used $Z=(d*x+c) \% y$. This equation will determine the class for a particular day on a particular period. That is, as input day number and slot number are used. In this equation, the output will be the class (Z), where d is total number of days in the cycle (starting with 0), x is the designated day (also starting with 0), c is the designated slot/period (also starting with 0), and y—is the total number of classes.

In an example, based on the input table, the system will determine that there are seven days (d=6 because counting starts with 0) and that there are seven classes (y=7). It may then check the class provided on each slot. For example, on day 1-x (second day) and slot 2-c (third slot in the day), it will input the following $Z=(6*1+2) \% 7$, which is 8% 7. The remainder of 8/7 is 1, as such Z=1. As noted above, AP US History was assigned a 1. That is, when Z=1, it is known that AP History is a class occurring in the requested slot. As depicted in FIG. 1, AP History is the third class on day two. Similarly, on day 2 (third day) and slot 4 (fifth class), the class is determined as follows $Z=(6*2+4) \% 7=2$, which is Pre-Cal as it is assigned a 2. The system can use the equation above to check each slot. As an alternative, the system can generate a pattern table using the known pattern and compare tables.

If the pattern is detected 204 (Yes), the determined fields are extracted 205 and the fields are stored 207. It is more efficient and to save memory to store fields as opposed to the entire table. If the pattern is not detected 204 (No), however, the entire table is stored in operation 206. In operation 208, the educators input the school schedule and the school schedule is stored in operation 209. There are various formats. The educators can designate the start and end date and holidays, half days, etc. As an alternative, if the entire table is stored in the system, the educators may designate a number for each school day using a pop up calendar, for example. This technique, however, will require more storage memory.

Figure 4:
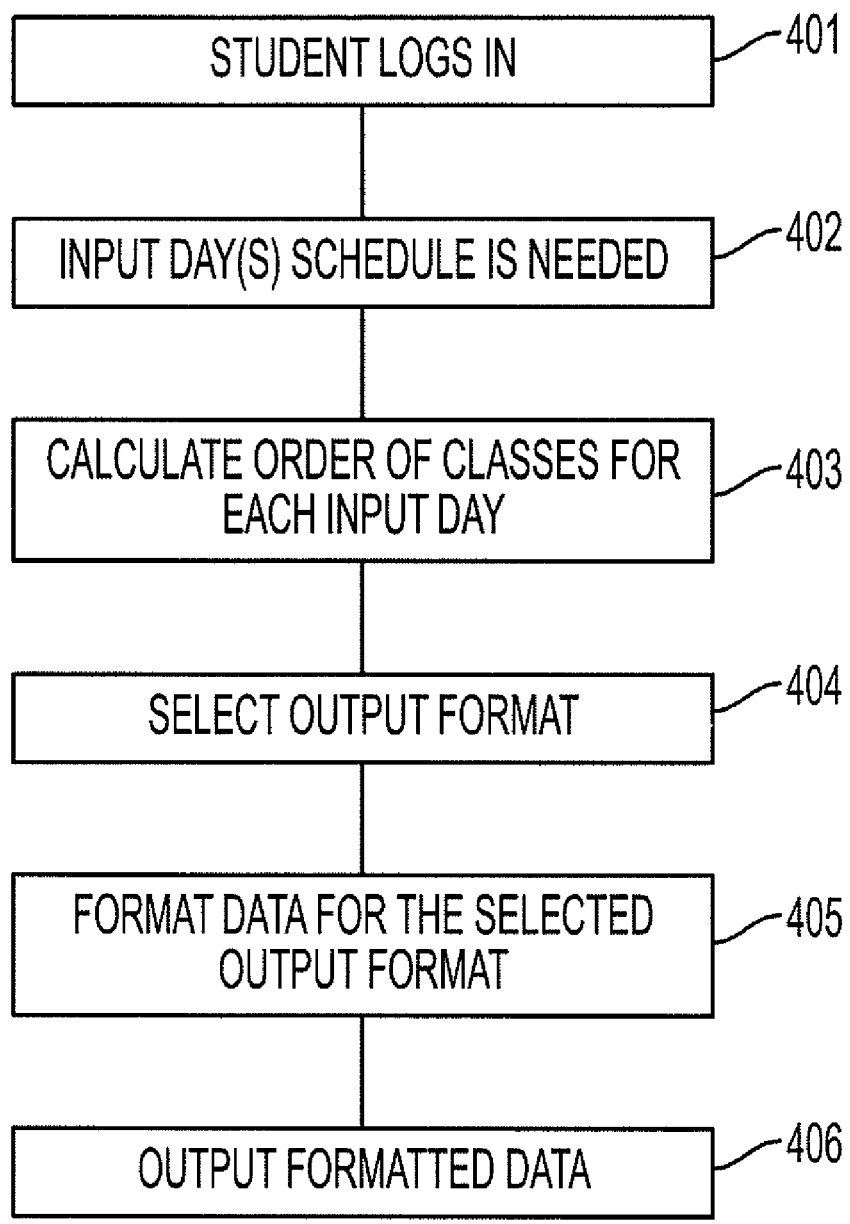
FIG. 4 is a flow chart illustrating method of obtaining schedule of classes according to an exemplary embodiment.

When the schedule is stored, the system is ready for use by students. As depicted in FIG. 4, the student logs in, in operation 401, e.g. by entering a user name and a password. The student then selects the day(s) 402 for which the schedule is needed. For example, the student may select, schedule for November 1 or schedule from November 16 to 20. For each day, the stored fields and the school schedule is used to generate and calculate the proper order of classes in operation 403.

For example, the system may first determine the number in the cycle for each input day e.g., November 1 corresponds to the day number 1 on the schedule. The system will then calculate the classes that day and the proper order of classes using the stored table or the stored fields. If the fields are stored, the equation noted above is used to determine the classes and the order of classes each day.

Figure 5:
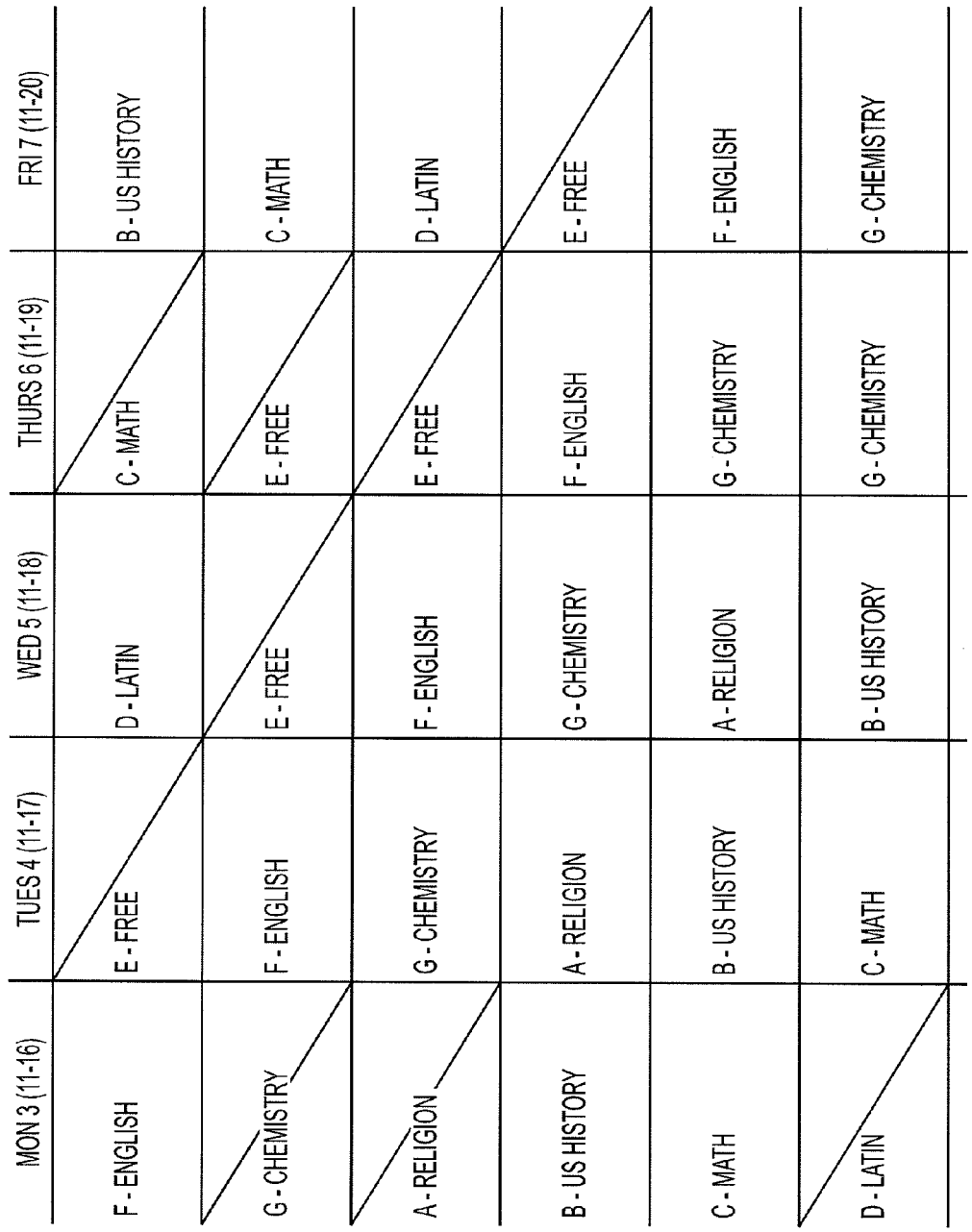
FIG. 5 is a view illustrating output of scheduling according to an exemplary embodiment.

Next, the student may be queried to select the output format 405 e.g., weekly planner printout, daily planner print out, monthly planner printout and so on. For example, if the student selects a daily planner, one page per each day is printed. On the other hand, if the student selects a weekly planner, a handout depicted in FIG. 5 may be printed. In addition, the printout may provide room for homework, notes, etc. The formatted data is then output in operation 406 e.g., FIG. 5.

In an exemplary embodiment, the students and teachers may input notes for each subject. The notes may be input prior or after the generation of the planner. For example, the student and/or teacher may input homework assignment, test date, and so on by simply designating class and date. The generated note will then be output with the selected planner. The generated note may be viewed, printed, emailed, or stored next to the corresponding class.

Figure 6:
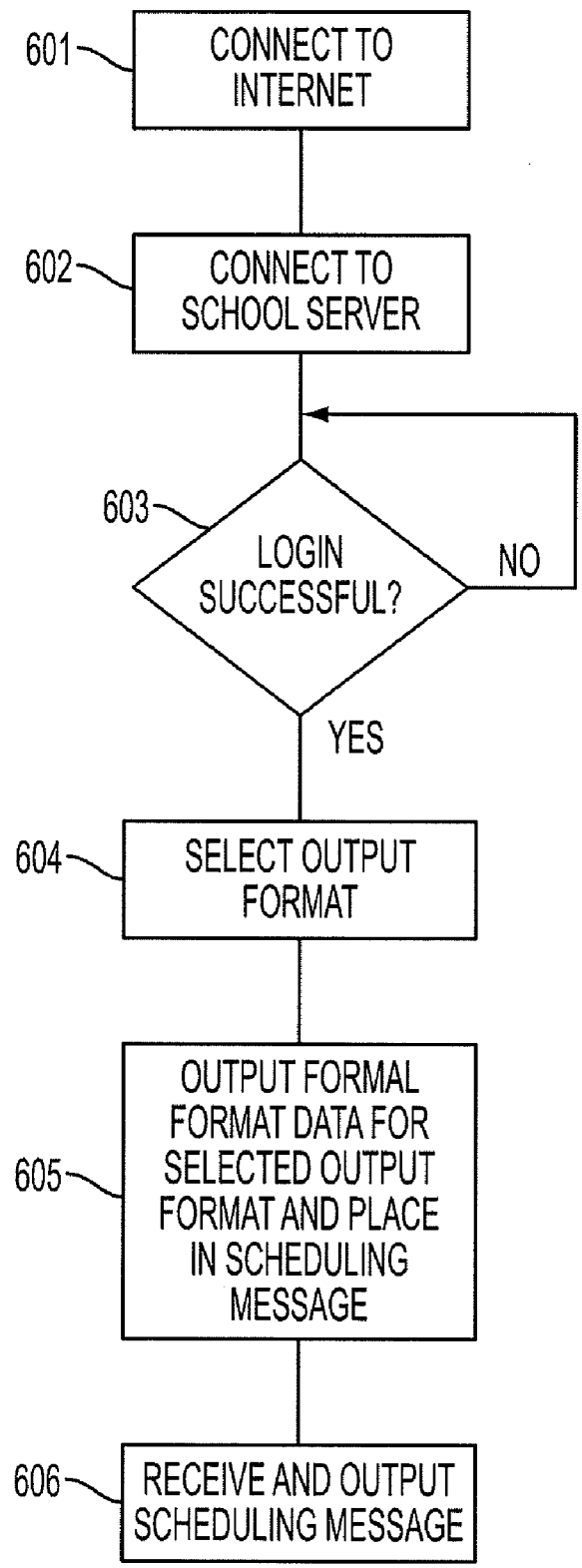
FIG. 6 is a flow chart illustrating a method of providing schedule to a mobile device according to an exemplary embodiment.

In an exemplary embodiment, the student may desire to view the schedule via a wireless device such as a mobile telephone with data access. For example, as depicted in FIG. 6, the mobile telephone connects to the internet, in operation 601. Using the internet, connection to the school server is established in operation 602. If the student successfully logs in, Yes—in operation 603. The student selects output format in operation 604. The data is formatted based on the selected output format in operation 605. If the login is not successful, No—in operation 603, the system waits for the proper log in.

Figure 7:
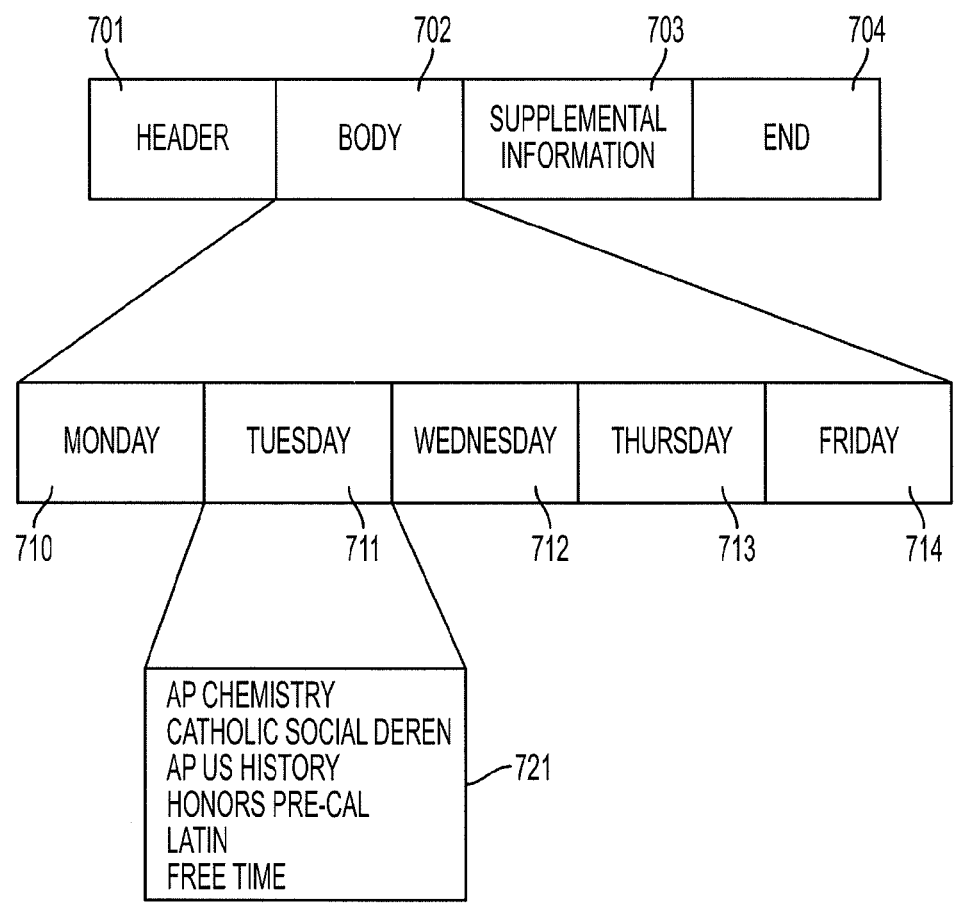
FIG. 7 is a block diagram illustrating a structure of a message transporting the schedule to a mobile device according to an exemplary embodiment.

The formatted data based on the selected output format is placed in a scheduling message such as the one shown in FIG. 7. The scheduling message comprises a header 701 that includes address information of the mobile device and any routing information that may be necessary, it may also include identification information as necessary. The body of the scheduling message 702 includes the schedule for each day. Specifically, if the student selected a weekly schedule, the message includes the schedule for Monday 710, Tuesday 711, Wednesday 712, Thursday 713, Friday 714. For each day, the schedule of classes is provided 721.

The scheduling message is received by the mobile device and output in operation 606. In an exemplary embodiment, an option is provided in which the student may simply input day and period and based on this input, the system will calculate the desired class. For example, if the classes are arranged in a roll and tumble pattern, the equation above is used.

In another exemplary embodiment, the educators may use the system to determine their schedules, assignments to assign each day, when to administer tests, and so on. Homework may be added for each class for each day in the calendar and that homework may be provided to the students along with the printout of the schedule.

Figure 8:
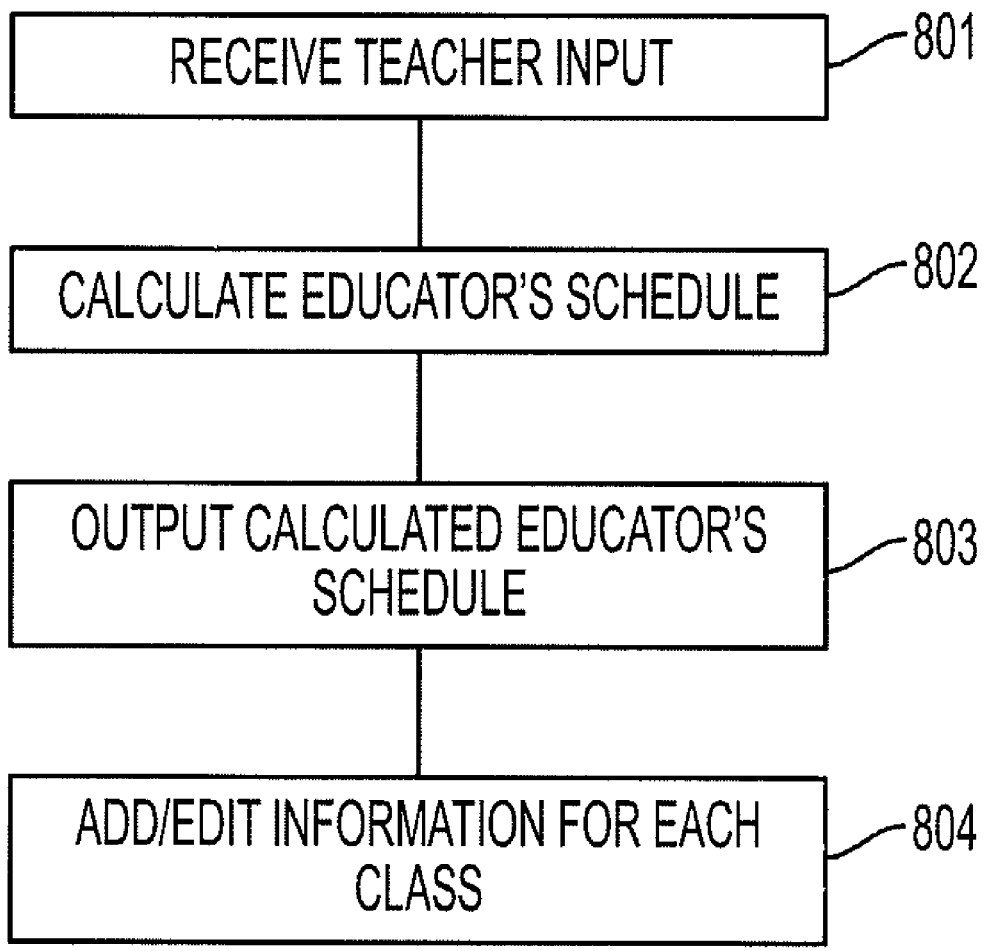
FIG. 8 is a flow chart illustrating a method of providing schedule of classes with option to edit information to an educator according to an exemplary embodiment.

For example, an educator may indicate the class(es), he or she teaches such as AP Chemistry and their last name, as shown in operation 801 in FIG. 8. For simplicity the access to the scheduling system for educators is only shown with respect to one class and one rotation but it will be understood by one of ordinary skill in the art that educators may teach several classes and that there may be several different rotations in each of which the educator teaches the same class. The educator will also input preferred output for educator's schedule. For example, the educator can view daily schedule, weekly schedule, monthly schedule, or the schedule for the entire semester. The system then determines/calculates the educator's schedule in operation 802 based on the input described above with reference to FIGS. 2-4 and outputs the calculated scheduled in operation 803. The educator may then add, edit, and delete information for each class such as homework, topics, test schedule, etc. in operation 804.

By way of an example, output of the weekly educator's schedule is depicted in FIG. 9. As shown in FIG. 9, the periods of educator's class is shown i.e., AP Chemistry, first period on Tuesday, second period on Wednesday, third period on Thursday, and fourth period on Friday. If the educator teaches more than one class, it will be depicted also. If the educator teaches in a number of rotations, each class will also be shown with an additional field such as Rotation A, Rotation B, etc. For each class, the educator has an option to add information 901 or edit existing information 902. Specifically, if the educator selects to add information 901, a drop down menu is provided in which the educator can select to add homework 903, a topic 905, and/or a test 906. This is provided by way of an example only and other options are possible. If the educator selects to add homework 903, a drop down text box 904 appears, in which the educator can type in the homework.

The educator may also modify existing/input information by selecting edit 902. When edit 902 is selected, a drop down menu appears in which the educator can select element to edit e.g., homework 903. If homework 903 is selected, the educator is shown a text box with existing homework assignment 904. The educator can modify text or chose to delete the assignment all together 907.

Although the above exemplary embodiment is provided with reference to a teacher, it is not limited to teachers only. The above exemplary embodiment is applicable to the use of any user such as a student, administrator, parent, and so on.

Figure 10:
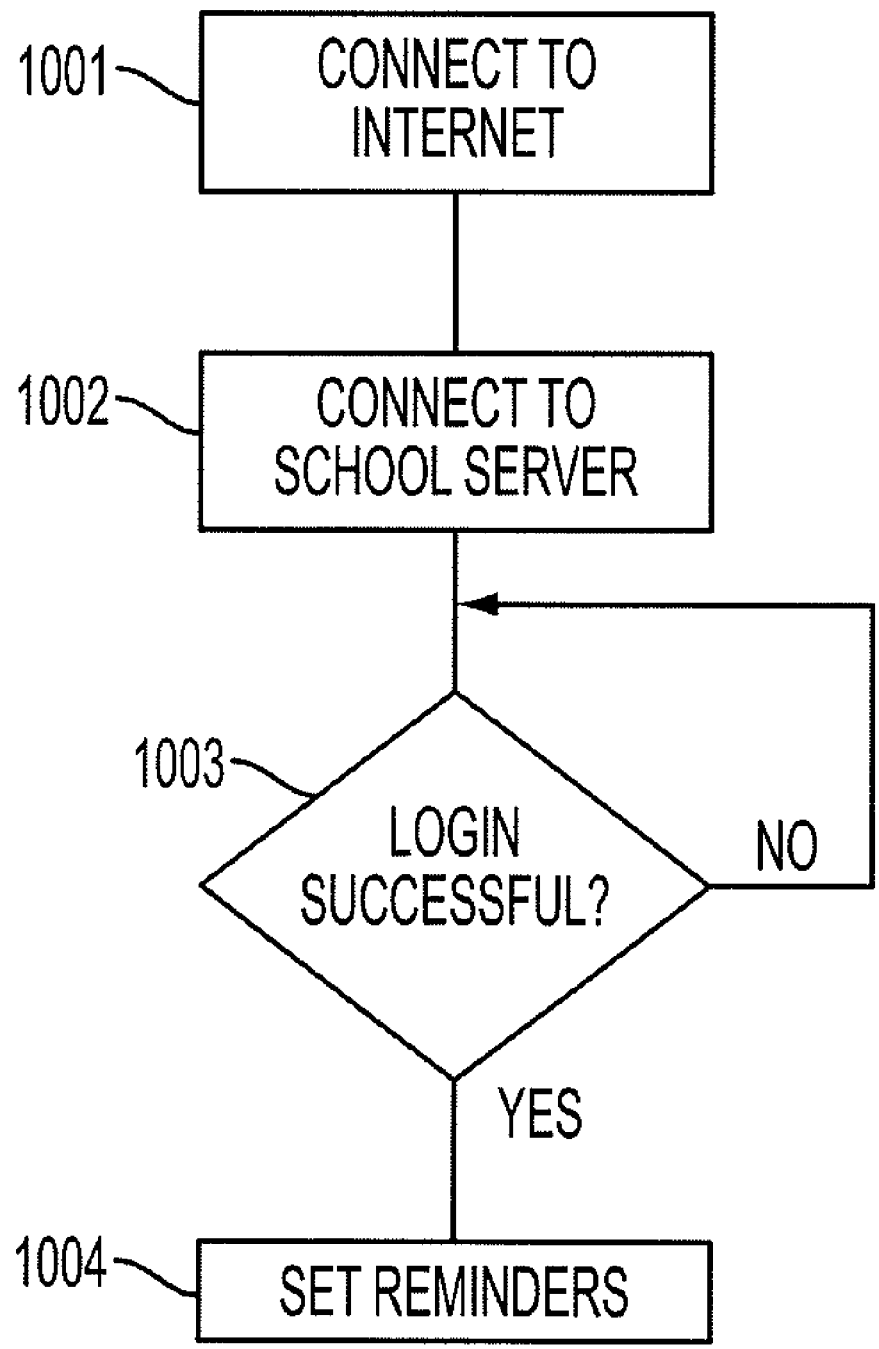
FIG. 10 is a flow chart illustrating a method of setting reminders according to an exemplary embodiment.

In an exemplary, non-limiting embodiment, users of the system such as educators and students can set various types of alarms (reminders). For example, as depicted in FIG. 10, the user connects to the internet using a terminal such as a personal computer, a laptop, or a mobile telephone, in operation 1001. Using the internet, connection to the school server is established in operation 1002. If the user successfully logs in, Yes in operation 1003. The user sets reminders in operation 1004.

Figure 11:
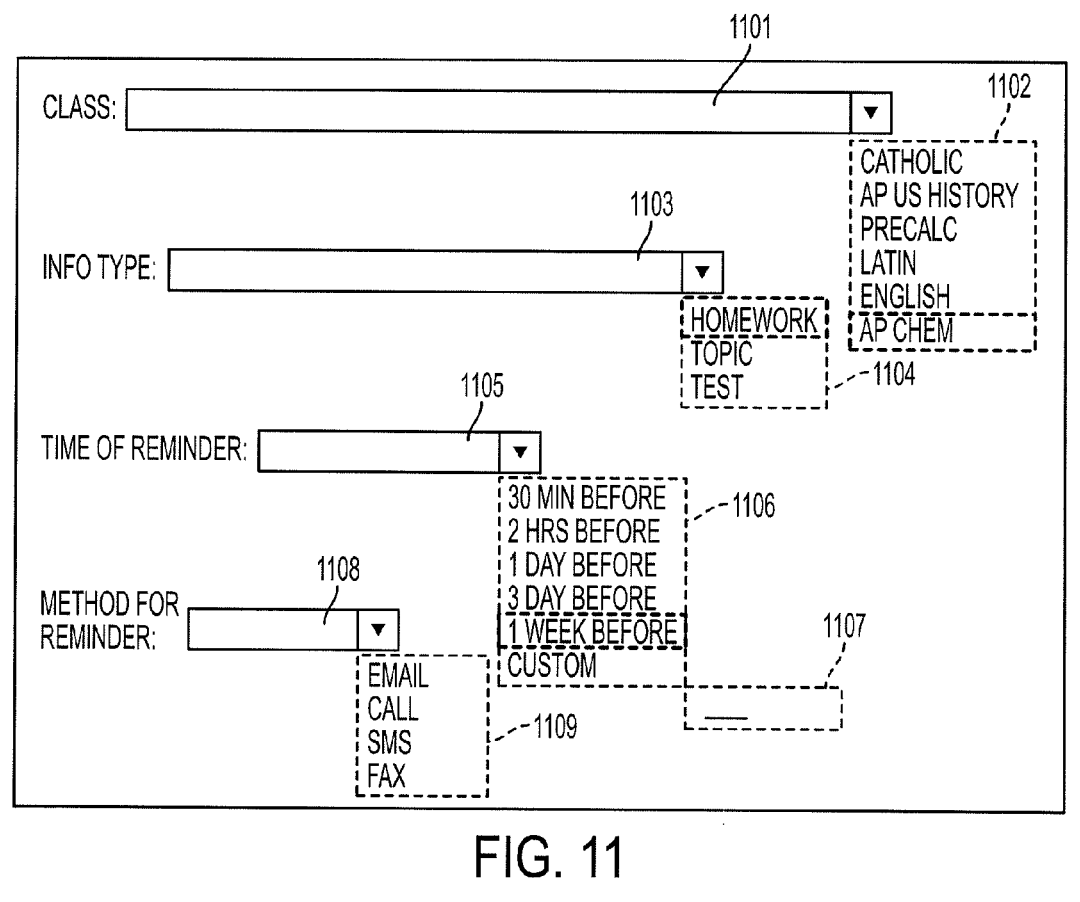

For example, as shown in FIG. 11, the user can select a class 1101 via a drop down box 1102. When class is selected, the user can select type of information for the class 1103 via a drop down menu 1104. Different classes may have different types information e.g., some classes have laboratory work, others projects, essays, oral presentations, etc. different types of information, time of each reminder and method of reminding, as exemplified in FIG. 11.

Some of the others options are the user may select several classes and/or several types of information and set the reminder same for the selected classes and/or types. Similarly, the user may select all classes and/or all types of information and set same reminder for all. This facilitates a more efficient setting of the alarms.

Next, the user sets the time for the reminder 1105. In particular, a drop down box 1106 may be provided in which the user may select one or more of the options by simply highlighting the desires times for the reminders for example. The user may also set one or more custom reminders by selecting custom option for which a text box is provided 1107 where the user inputs desired time of the reminder. Once this custom reminder is input, it may appear as a highlighted menu option in the drop down box 1106.

Next, the user may select the method for the reminder. For example, via a drop down box 1108, the user may select email, call, SMS, and/or fax 1109. More than one may be selected and the user may be provided with a further drop down menu box to input one or more emails, telephone numbers, and so on. For simplicity, FIG. 11 simply shows setting one method of reminders for all selected information. However, in an exemplary embodiment, a user may set different methods for different times of the reminders such that one day before an email is received, two hours before an SMS is send, and thirty minutes before a phone call is made with automate voice message to the user. Also, the user may set reminders to different email addresses, telephone numbers, etc.

In an exemplary embodiment, the user may choose to also set a notification when information to the class is added, edited, or deleted with exact information about the change. For example, if due to a snow day, the educator changes the date of the test, the user may receive a notification about this change. The reminders will automatically adjust to accommodate this change.

Figure 12A:
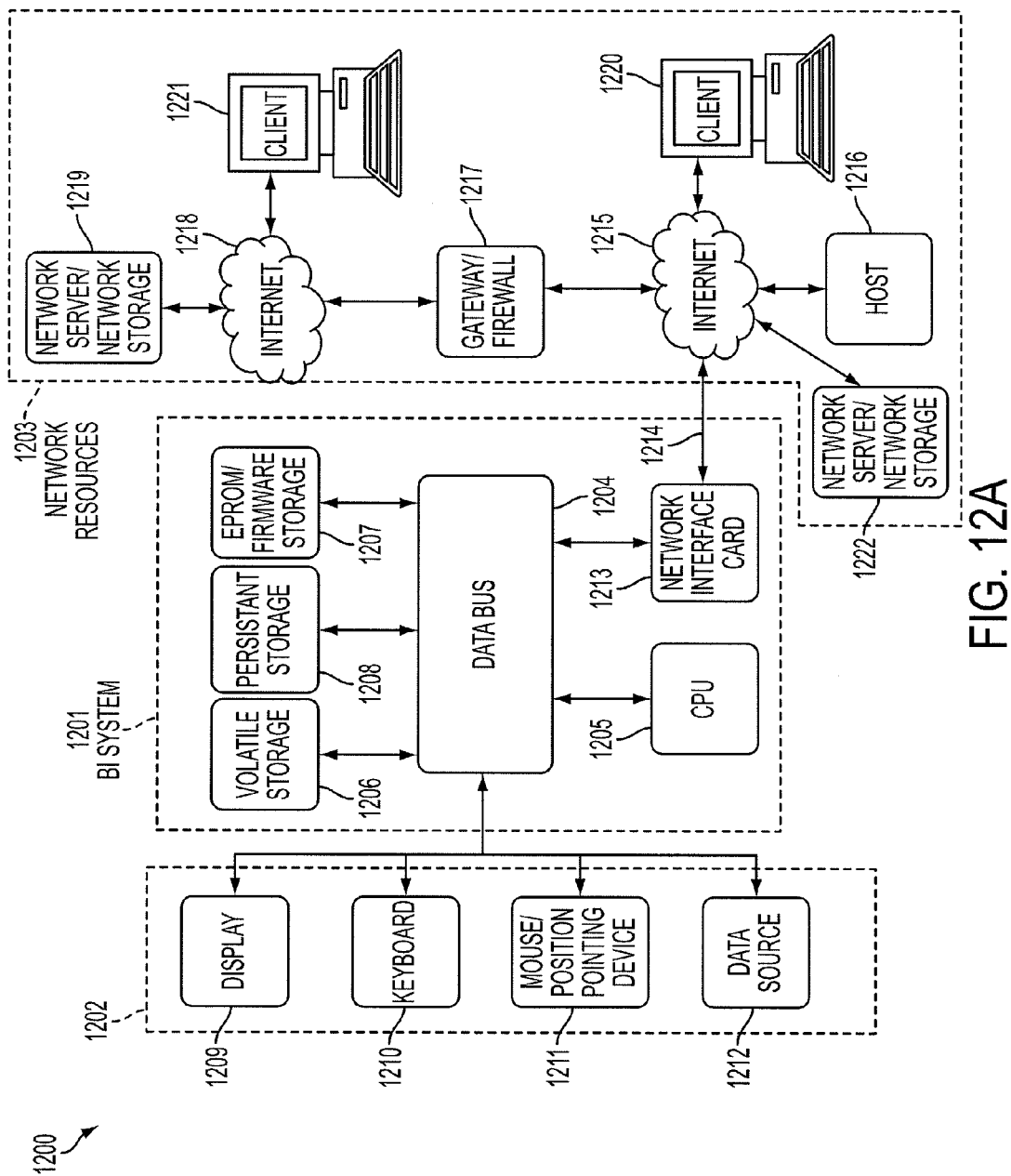
FIGS. 12A and 12B are diagrams illustrating scheduling system structure that provides scheduling of classes according to an exemplary embodiment.

FIG. 12A is a block diagram that illustrates a computer/server system 1200 that executes the scheduling method according to an exemplary embodiment. The system 1200 includes a computer/server platform 1201, peripheral devices 1202 and network resources 1203.

The computer platform 1201 may include a data bus 1204 or other communication mechanism for communicating information across and among various parts of the computer platform 1201, and a processor 1205 coupled with bus 1201 for processing information and performing other computational and control tasks. Computer platform 1201 also includes a volatile storage 1206, such as a random access memory (RAM) or other dynamic storage device, coupled to bus 1204 for storing various information as well as instructions to be executed by processor 1205. The volatile storage 1206 also may be used for storing temporary variables or other intermediate information during execution of instructions by processor 1205.

Computer platform 1201 may further include a read only memory (ROM or EPROM) 1207 or other static storage devices coupled to bus 1204 for storing static information and instructions for processor 1205, such as basic input-output system (BIOS), as well as various system configuration parameters. A persistent storage device 1208, such as a magnetic disk, optical disk, or solid-state flash memory device is provided and coupled to bus 1201 for storing information and instructions. For example, the persistent storage device 1208 may store one or more security lists and may also include cache that stores metadata members.

Computer platform 1201 may be coupled via bus 1204 to a display 1209, such as a cathode ray tube (CRT), plasma display, or a liquid crystal display (LCD), for displaying information to a user of the computer platform 1201. An input device 1220, including alphanumeric and other keys, is coupled to bus 1201 for communicating information and command selections to processor 1205. Another type of user input device is cursor control device 1211, such as a mouse, a trackball, or cursor direction keys for communicating direction information and command selections such as receiving student selections or obtaining the schedule from educators to a processor 1204 and for controlling cursor movement on display 1209. This input device typically has two degrees of freedom in two axes, a first axis (e.g., x) and a second axis (e.g., y), that allows the device to specify positions in a plane.

An external storage device (a data source) 1212 may be connected to the computer platform 1201 via bus 1204 that stores metadata used by the computer platform 1201. Although only one data source 1212 is depicted for purposes of simplicity, a number of data sources 1212 may be present as well as other types of data sources.

The term "computer-readable medium" as used herein refers to any medium that participates in providing instructions to processor 1205 for execution. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having two or more wires, a portable computer diskette such as a floppy disk or a flexible disk, magnetic tape or any other magnetic medium, a hard disk., a random access memory (RAM), a read-only memory (ROM), an erasable programmable read-only memory (EPROM or Flash memory), a memory card, any other memory chip or cartridge, an optical fiber, a portable compact disc read-only memory (CD-ROM), any other optical medium, punchcards, papertape, any other physical medium with patterns of holes, or any other medium from which a computer can read or suitable combination of the foregoing.

In the context of this document, a computer readable storage medium may be any tangible, non-transitory medium that can contain, or store a program for use by or in connection with an instruction execution system, apparatus, or device.

A computer readable signal medium may include a propagated data signal with computer readable program code embodied therein, for example, in a base band or as part of a carrier wave. Such a propagated signal may take any of a variety of forms, including, but not limited to, the electromagnetic, optical, or any suitable combination thereof. The computer readable signal medium may include coaxial cables, copper wire and fiber optics, including the wires that comprise data bus 1204. The computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc. or any suitable combination of the foregoing.

Computer program code for carrying out operations for aspects of the exemplary embodiments may be written in any combination of one or more programming languages, including an object oriented programming language such as Java, Smalltalk, C+, .Net or the like and conventional procedural programming languages. The program code may execute entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 1208. Volatile media includes dynamic memory, such as volatile storage 1206.

Various forms of computer readable media may be involved in carrying one or more sequences of one or more instructions to processor 1205 for execution. For example, the instructions may initially be carried on a magnetic disk from a remote computer. Alternatively, a remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on the data bus 1204. The bus 1204 carries the data to the volatile storage 1206, from which processor 1205 retrieves and executes the instructions. The instructions received by the volatile memory 1206 may optionally be stored on persistent storage device 1208 either before or after execution by processor 1205. The instructions may also be downloaded into the computer platform 1201 via Internet using a variety of network data communication protocols well known in the art.

The computer platform 1201 also includes a communication interface, such as network interface card 1213 coupled to the data bus 1204. Communication interface 1213 provides a two-way data communication coupling to a network link 1214 that is connected to a local network 1215. For example, communication interface 1213 may be an integrated services digital network (ISDN) card or a modem to provide a data communication connection to a corresponding type of telephone line. As another example, communication interface 1213 may be a local area network interface card (LAN NIC) to provide a data communication connection to a compatible LAN. Wireless links, such as well-known 802.11a, 802.11b, 802.11g and Bluetooth may also be used for network implementation. In any such implementation, communication interface 1213 sends and receives electrical, electromagnetic or optical signals that carry digital data streams representing various types of information.

Network link 1213 typically provides data communication through one or more networks to other network resources. For example, network link 1214 may provide a connection through local network 1215 to a host computer 1216, or a network storage/server 1217. Additionally or alternatively, the network link 1213 may connect through gateway/firewall 1217 to the wide-area or global network 1218, such as an Internet. Thus, the computer platform 1201 can access network resources located anywhere on the Internet 1218, such as a remote network storage/server 1219, which is another example of a data source. On the other hand, the computer platform 1201 may also be accessed by clients located anywhere on the local area network 1215 and/or the Internet 1218. The network clients 1220 and 1221 may access the system 1201 remotely.

Local network 1215 and the Internet 1218 both use electrical, electromagnetic or optical signals that carry digital data streams. The signals through the various networks and the signals on network link 1214 and through communication interface 1213, which carry the digital data to and from computer platform 1201, are exemplary forms of carrier waves transporting the information.

Computer platform 1201 can send messages and receive data, including program code, through the variety of network(s) including Internet 1218 and LAN 1215, network link 1214 and communication interface 1213. In the Internet example, when the system 1201 acts as a network server, it might transmit a requested code or data for an application program running on client(s) 1220 and/or 1221 through Internet 1218, gateway/firewall 1217, local area network 1215 and communication interface 1213. Similarly, it may receive code from other network resources.

The received code may be executed by processor 1205 as it is received, and/or stored in persistent or volatile storage devices 1208 and 1206, respectively, or other non-volatile storage for later execution. In this manner, computer system 1201 may obtain application code in the form of a carrier wave.

Figure 12B:
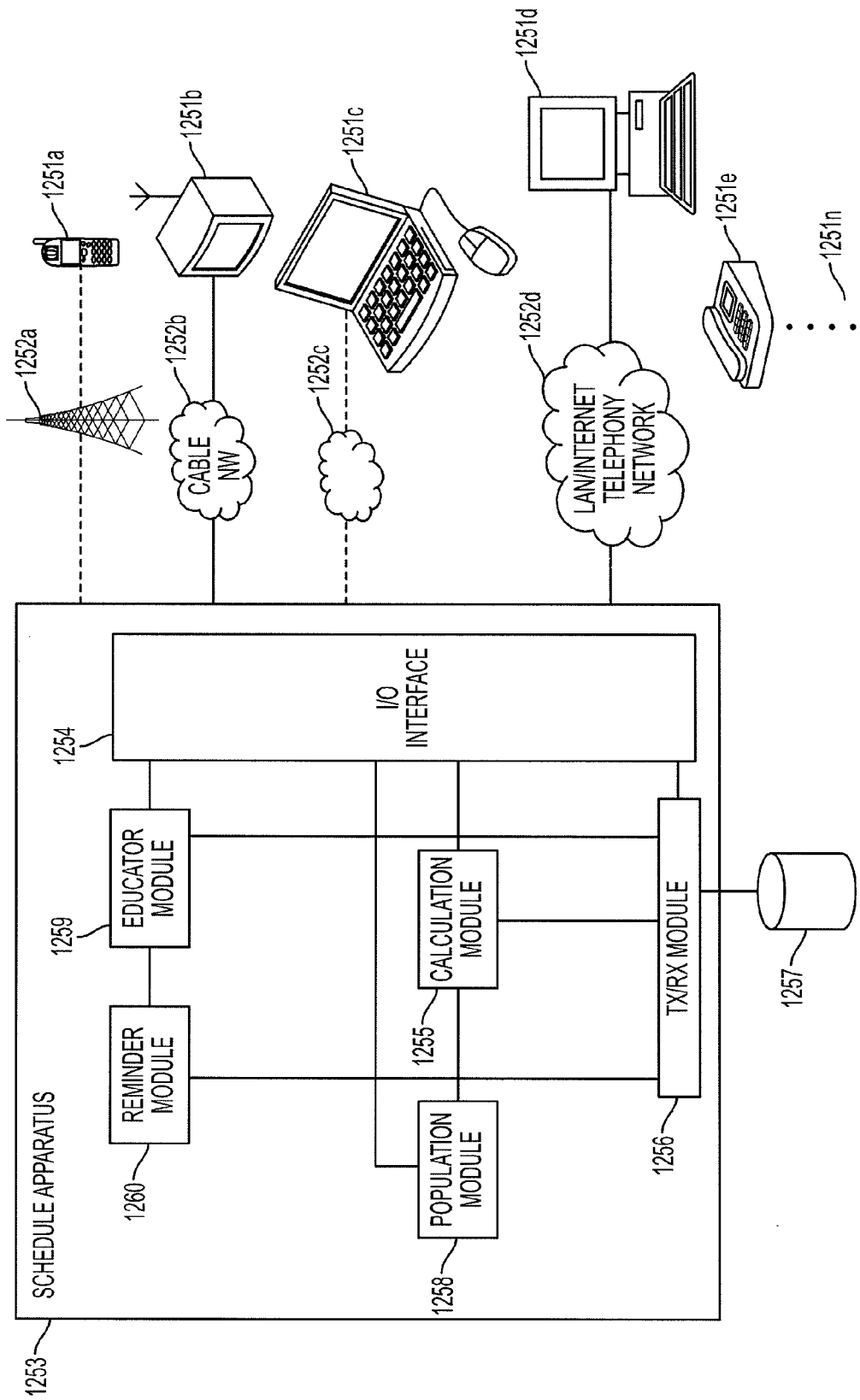

An exemplary scheduling system according to an exemplary embodiment is depicted in FIG. 12B. Specifically, user terminals 1251a-1251n are provided. The user terminals 1251a-1251n may be used by students and educators to send information such as schedule cycle, desired format, method, and so on and to receive information such as schedules and reminders. For example, a user terminal 1251a is a mobile terminal that communicates via base station 1252a using a cellular network such as GSM, CDMA, and so on with the scheduling apparatus 1253. A user terminal 1251b is a television, which may send and receive information using a set top box via the cable network 1252b to the scheduling apparatus 1253. The received information may be provided as an overlay on a channel being displayed or a separate channel may be provided dedicated to the schedules. A user terminal 1251c is a laptop, which connects to the scheduling apparatus 1253 wirelessly using WIFI, Bluetooth for example, or wired using a cable and a modem that connects the laptop to the Internet for example. A user terminal 1251d is a personal computer that communicates with the scheduling apparatus 1253 using various types of networks 1252d.

The scheduling apparatus 1253 may include one or more servers and memories. The scheduling apparatus 1253 may include one or more processors and may be connected to one or more databases. The scheduling apparatus 1253 may be a number of apparatuses. The scheduling apparatus 1253 includes an input/output (I/O) interface 1254. The I/O interface 1254 receives user input and transmits formatted schedule and reminders to various devices. For example, when the user input of a predetermined schedule cycle is received via the I/O interface 1254, the calculation module 1255 determines the schedule cycle (if for example, only a pattern is input) and stores the schedule cycle e.g., a table with the actual schedule in a database 1257 via an interface 1256. The interface 1256 is a transmission/reception module. The calculated order of classes may also be provided to the populating module 1258, which populates an organizer with the schedule. The population module 1258 may also obtain the schedule cycle from the database 1257. The population module 1258 also communicates with the I/O interface 1254 to provide the generated schedule to one of the user terminals 1251a-1251n.

The I/O interface module 1254 recognizes a method for transmitting the received data e.g., by receiving this information from the database 1257 or by receiving this information from the population or calculation modules 1258, 1255, along with the information to be transmitted to the user. The I/O interface module 1254 includes a number of units for converting the received information into a format of a respective network. For example, the I/O interface module 1254 may include a voice generation unit, an email generation unit, a facsimile generation unit, an SMS generation unit, an HTML/XML generation unit, a PDF generation unit, an MS Word generation unit, and so on. In other words, each respective module parses the received information and converts the received information in accordance with a method for transmission. In addition, the I/O interface module 1254 formats the received information in accordance with the formal specified by the user e.g., a weekly unit which generates a weekly calendar and inputs the schedule for a specified week, a monthly unit which generates a monthly calendar and inputs the schedule for each day in the specified month, and so on.

In addition, the I/O interface module 1254 recognizes request from an educator to modify additional information i.e., by parsing input from the user, and provides the request to the educator module 1259. The educator module 1259 generates GUI such as the one depicted in FIG. 9 and analyzes received input from the educator to add/delete/edit additional information. The modifications are stored in the database 1257 along with respective classes. In addition, the modification may be provided to a reminder module 1260, which generates reminders based on the made changes in accordance with the reminder setting that may also be stored in a database 1257.

The flowchart and block diagrams in the Figures illustrate the architecture, functionality, and operation of possible implementations of systems, methods and computer program products according to various exemplary embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or two blocks may sometimes be executed in the reverse order, depending upon the functionality involved. It will also be noted that each block of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or acts for performing the function in combination with other claimed elements as specifically claimed. The description of the exemplary embodiments has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A scheduling method comprising:
receiving a user request comprising type of a predetermined scheduling pattern and a number of classes per day;
calculate an order of classes for each calendar date in a scheduling cycle based on the user request and a calendar;
automatically populating, by a computer, each date in the calendar with the calculated order of classes such that each class is mapped to a respective calendar date and to a respective slot in the calendar date based on the user request and based on the scheduling cycle; and
providing a schedule in a predetermined output format or in a format specified by the user,
wherein the calculating comprises determining the respective calendar date in the scheduling cycle, and calculating the order of classes for the respective calendar date based on the predetermined scheduling pattern which comprises roll and tumble, and
wherein the order of each class is calculated according to the following equation: $Z=(d*x+c)\div y$, wherein d is total number of days, x is a designated day, c is a designated slot, and y is a total number of classes.

2. The scheduling method of claim 1, wherein the calculating further comprises retrieving ordering method from storage based on a type of the received predetermined scheduling pattern and the automatically populating said each day in the calendar is performed using the retrieved ordering method.

3. The scheduling method of claim 1, wherein the format specified by the user comprises: a daily schedule, a weekly schedule, a monthly schedule, schedule for a semester, a schedule for an input time period and for an input at least one class.

4. The scheduling method of claim 1, further comprising outputting the schedule determined based on the populated calendar, wherein each class is provided with additional information.

5. The scheduling method of claim 4, wherein the additional information is input by an educator and comprises at least one of a homework assignment, a topic, a test, a laboratory indicator, an oral presentation indicator, and a project presentation indicator, and a submission indicator.

6. The scheduling method of claim 1, further comprising:
receiving user input related to a method of providing the schedule, the method comprises an email, a facsimile, an SMS, a voice memo, and displaying the schedule on a display device; and
transmitting the schedule to a mobile terminal using the received method.

7. The scheduling method of claim 1, further comprising:
executing on a mobile terminal a mobile terminal module which interfaces with the populated calendar and displays the populated calendar on a display of the mobile device, the schedule determined based on the populated calendar.

8. The scheduling method of claim 1, further comprising generating a voice message that provides the schedule determined based on the populated calendar and transmitting the generated voice message to a mobile terminal.

9. The scheduling method of claim 1, further comprising:
outputting the schedule for an educator wherein the schedule is determined based on the populated calendar;
for at least one class in the schedule, performing by the educator at least one of adding editing, and deleting additional information for the respective class in the schedule; and
transmitting a notification to a student subscribed to a class for which the educator input, edited or deleted the additional information, wherein the notification identifies changes made by the educator.

10. The scheduling method of claim 1, further comprising:
- storing additional information for each class in the populated calendar;
- generating at least one reminder based on said additional information; and
- outputting the at least one generated reminder via a predetermined method in a specified format.

11. The scheduling method of claim 10, wherein the specified format comprises identification of a class and input type of the additional information for which the at least one reminder is to be output and wherein the predetermined method comprises at least one of a voice memo, an email, an SMS, and a facsimile.

12. A scheduling system comprising:
- a user input module which receives a user request comprising type of a predetermined scheduling pattern and a number of classes per day;
- a calculation module which calculates an order of classes for each calendar date in a scheduling cycle based on the user request and a calendar;
- a populating module which automatically populates each date in the calendar with the calculated order of classes such that each class is mapped to a respective calendar date and to a respective slot in the calendar date based on the user request and based on the scheduling cycle, and provides a schedule in a predetermined output format or in a format specified by the user,
- wherein the calculation module determines the respective calendar date in the scheduling cycle, and calculates the order of classes for the respective calendar date based on the predetermined scheduling pattern which comprises roll and tumble, and
- wherein the order of each class is calculated according to the following equation: $Z=(d*x+c)\div y$, wherein d is total number of days, x is a designated day, c is a designated slot, and y is a total number of classes.

13. The scheduling system of claim 12, wherein the format specified by the user comprises: a daily schedule, a weekly schedule, a monthly schedule, schedule for a semester, a schedule for an input time period and for an input at least one class.

14. The scheduling system of claim 12, wherein the user input module receives user input regarding method of outputting the schedule determined based on the populated calendar, where the method comprises: an email, a facsimile, an SMS, a voice memo, and displaying the schedule on a display device; and
- further comprising a transmission module which transmits the schedule to a mobile terminal using the received method.

15. The scheduling system of claim 12, further comprising:
- a mobile terminal module which executes on a mobile terminal, interfaces with the populated organizer, and displays the schedule determined based on the populated calendar on a display of the mobile device; and
- a voice generating module which generates a voice message that provides the schedule determined based on the populated organizer; and
- a transmission module which transmits the generated voice message to the mobile terminal.

16. The scheduling system of claim 12, further comprising:
- an output module which outputs the schedule for an educator where the schedule is determined based on the populated calendar, wherein the user input module, for at least one class in the schedule, receives input from the educator in which the educator adds, edits, or deletes additional information for the respective class in the schedule;
- a transmission module which transmits a notification to a student subscribed to the respective class in which the additional information was modified by the educator;
- a storage module which stores additional information for each class in the populated calendar;
- a reminder generating module which generates said at least one reminder based on the user input received by the user input module; and
- an output module which outputs via a predetermined method the at least one reminder in a specified format,
- wherein the specified format comprises class and input type of the additional information for which the at least one reminder is to be output,
- wherein the predetermined method comprises at least one of a voice memo, an email, an SMS, and a facsimile, and
- wherein the notification identifies changes made by the educator.

17. The scheduling method of claim 4, further comprising: an educator inputting the additional information comprising an event to reoccur every $n^{th}$ class where n is an integer greater than 1 and wherein the addition information comprises at least one of a test, a quiz, a laboratory, an oral presentation, a project presentation, and a submission.

18. The scheduling method of claim 1, wherein:
- the type of the predetermined scheduling pattern comprises roll and tumble,
- which class is to be provided in a respective slot is calculated based on total number of days, total number of classes, a respective day, and the respective slot, and
- the predetermined scheduling pattern is independent from weekly calendar.

19. A non-transitory computer readable medium storing instructions when executed by a computer causes the computer to perform the following operations comprising:
- receiving a user request comprising type of a predetermined scheduling pattern and a number of classes per day;
- calculate an order of classes for each calendar date in a scheduling cycle based on the user request and a calendar;
- automatically populating each date in the calendar with the calculated order of classes such that each class is mapped to a respective calendar date and to a respective slot in the calendar date based on the user request and based on the scheduling cycle; and
- providing a schedule in a predetermined output format or in a format specified by the user,
- wherein the calculating comprises determining the respective calendar date in the scheduling cycle, and calculating the order of classes for the respective calendar date based on the predetermined scheduling pattern which comprises roll and tumble, and
- wherein the order of each class is calculated according to the following equation: $Z=(d*x+c)\div y$, wherein d is total number of days, x is a designated day, c is a designated slot, and y is a total number of classes.

* * * * *